United States Patent [19]
Schmidt et al.

[11] 3,898,247
[45] Aug. 5, 1975

[54] POLY(ARYL CYCLIC SULFONIUM) SALTS

[75] Inventors: Donald L. Schmidt; Hugh B. Smith, both of Midland, Mich.; Melvin J. Hatch, Socorro, N. Mex.; William E. Broxterman, Midland, Mich.

[73] Assignee: The Dow Chemical Company, Midland, Mich.

[22] Filed: July 26, 1973

[21] Appl. No.: 382,976

[52] U.S. Cl. 260/332.2 R; 260/327 TH; 260/329 HS; 260/332.3 R; 260/332.5; 260/78.4 R
[51] Int. Cl............................................ C07d 63/04
[58] Field of Search 260/327 TH, 329 HS, 332.2 R, 260/332.3 R, 332.5

[56] References Cited
OTHER PUBLICATIONS
Nambara, et al., Yakugau Zassi, 83: 642–647 (1963).

*Primary Examiner*—Henry R. Jiles
*Assistant Examiner*—C. M. S. Jaisle
*Attorney, Agent, or Firm*—Chessie E. Rehberg

[57] ABSTRACT
New compounds are described having the formula

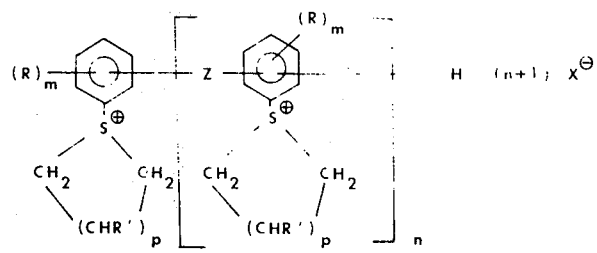

wherein each R is H, Cl, alkyl, aryl, alkoxy or aryloxy, each R' is H, Cl, Br, OH or alkyl, $m$ is 0–2, $n$ is 1–5, $p$ is 2–3, Z is a linking group, such as O, S, $CH_2$, $C(CH_3)_2$ or the like and $X^-$ is an anion. They are made from the corresponding polythiophenolic compounds by reaction with a compound of the formula $$Y - CH_2 - (CHR')_p - CH_2 - Y$$

wherein each Y is Cl, Br, $OSO_3H$ or other reactive groups.

A carboxyl group opens the sulfonium ring, forming the corresponding arylthioalkyl ester of the carboxyl group. This property makes the compounds useful for making polymers by reaction with polycarboxylic acids and for cross-linking carboxyl-containing polymers.

10 Claims, No Drawings

POLY(ARYL CYCLIC SULFONIUM) SALTS

BACKGROUND OF THE INVENTION

Hatch et al., U.S. Pat. No. 3,660,431 disclosed somewhat similar compounds wherein each aromatic nucleus bears a phenolic OH group. The presence of this group enables the compounds to form zwitterions and to be polymerized.

SUMMARY OF THE INVENTION

The invention comprises new compounds and methods for their preparation. The compounds are of Formula I

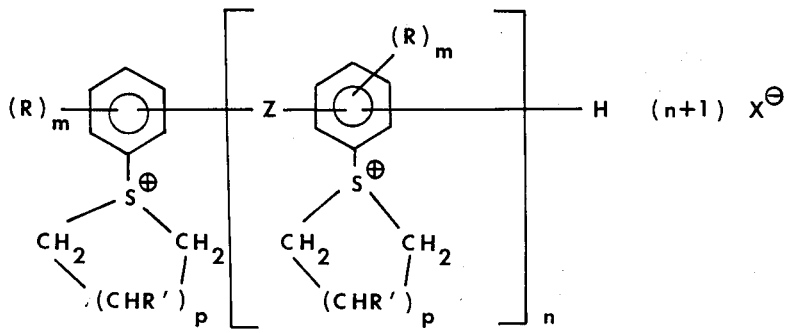

wherein each R is H, Cl, alkyl, aryl, alkoxy or aryloxy, each R' is H, Cl, Br, OH or alkyl, $m$ is 0–2, $n$ is 1–5, $p$ is 2–3, Z is a chemical bond or a linking group, such as O, S, alkylene or alkylenedioxy and $X^-$ is an anion.

The compounds of the invention may be made by condensing the corresponding polythiols with a compound of the formula $$YCH_2(CHR')_nCH_2Y$$

wherein R' and p are as defined above and each Y is Cl, Br, $OSO_3H$, $OSO_3R''$ or the like, wherein R'' is alkyl, phenyl, tolyl or the like.

DETAILED DESCRIPTION OF THE INVENTION

The compounds of the invention are water-soluble or water-dispersible crystalline solids. Those in which the anion, $X^-$, is weakly nucleophylic, such as $Cl^-$, $HSO_4^-$, $HCO_3^-$, $ClO_4^-$ or the like are stable salts that may be stored indefinitely at ordinary temperatures. Those in which the anion is strongly nucleophylic, such as $I^-$, $OH^-$, acetate, etc., are less stable since the sulfonium ring may be opened at the sulfur atom by them.

A compound of Formula I may be regarded as the product of the condensation of two reactants:

1. the corresponding polynuclear polythiol

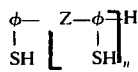

2. a 1,4- or 1,5-alkylene reactant

where the various symbols have the significance set forth above.

Many suitable polythiols are known and others can be made by known methods. Thus, several are disclosed in U.S. Pat. No. 3,594,446. Others and general methods for their preparation, are disclosed by Suter and Scrutchfield, J. Am. Chem. Soc., 58, 54 (1936), and Marvel and Caesar, J. Am. Chem. Soc., 73, 1097 (1951). The preferred thiols are the dithiols wherein Z is —O—, —S—, lower alkylene or alkylenedioxy (up to about 4 carbon atoms) such as $—CH_2—C(CH_3)_2—$, $—O(CH_2)_2O—$ and the like, or is a chemical bond. When increased flexibility is desired in the molecule, the linking group, —Z—, should be a longer alkylene or alkylenedioxy chain, such as 1,3-propylenedioxy or 1,4-butylene. When a functionality of 3 or more is desired, the polyalkylenepolythiols, such as the polymethylenepolythiophenols and polyisopropylidenepolythiophenols are most readily available. They are usually $(n+1)$ $X^\ominus$ produced as mixtures of species having functionality of 2,3,4, etc. up to about 8–10, the average functionality of the mixture being about 2.2–6. Such mixtures are suitable for use in the present invention without being separated into their components.

The position of the thiol groups on the aromatic rings of the polythiols is of little significance in the invention, though they show a strong tendency toward formation of the para isomers. As a matter of convenience, then, those having a predominance of para orientation are generally used. Because of their ready availability, the preferred dithiols for use in making the compounds of the invention are those derived from biphenyl, diphenyl oxide, diphenyl sulfide, diphenylmethane, isopropylidenebis(thiophenol) and the like and the lower alkyl- and alkoxy-and/or halogen-substituted derivatives of the foregoing.

Thiols of functionality greater than 2 are conveniently made by chlorosulfonating and reducing the corresponding polycyclic compounds. Thus, for example, anisole, phenetole, diphenyl oxide, diphenyl sulfide or the like may be condensed with formaldehyde, acetaldehyde, acetone or the like to produce polycyclic compounds which can then be chlorosulfonated and reduced in known manner. The known polyphenyl ethers and thioethers can be used likewise, of course.

The 1,4- or 1,5-alkylene reactant that is condensed with the polythiol may be substantially any compound having two reactive substituents on an aliphatic chain such that the substituents are separated by 4 or 5 carbon atoms. Other substituents, reactive or unreactive, may be present so long as they do not cause such steric hindrance as to interfere with the desired condensation. Permissible substituents include lower alkyl (i.e., having up to about 4 carbon atoms), lower alkoxy and hydroxy. Suitable such reactants include 1,4-dibromobutane, 1,5-dibromopentane, 4-bromobutanol, 5-chloropentanol, 1,2,3-trihydroxy-4- bromobutane, 2,3-dimethyl-1,5-dibromopentane, 1,4-dibromo-2-chlorobutane, and 2-butyl-4-bromobutanol.

A wide variety of the above reactants are commercially available or can readily be made by known methods.

The above reactants can be condensed to produce the compounds of the invention by several methods:

a. the thiophenol or its alkali metal salt is reacted with 1 mole per thiol group of a 1,4- or 1,5- dibromo- or -dichloroalkane or alkene in the presence of excess alkali;

b. the thiophenol alkali metal salt is reacted with 1 equivalent per thiol group of a 4- or 5-haloalcohol to produce the 4- or 5-hydroxyalkyl aryl sulfide and the latter is then cyclized by treatment with benzenesulfonyl chloride or tosyl chloride;

c. the preferred method replaces the arylsulfonyl chloride of (b) with chlorosulfonic acid. This produces directly the bisulfate salt of the sulfonium product.

In the preferred process, the 4- or 5-hydroxyalkyl aryl sulfide is reacted with an equivalent amount of chlorosulfonic acid in an inert solvent, such as methylene chloride, perchloroethylene, carbon tetrachloride or benzene, at a temperature of about −10°C. or lower, thus to form the bisulfate ester. Vacuum distillation of the solvent together with gradual warming of the residue to about 70°C. causes ring closure, thus forming the bisulfate salt of the cyclic sulfonium compound. The mixing of the reactants is conducted at low temperature to avoid danger of sulfonating the aromatic nucleus. Its ease of sulfonation varies according to the substituents thereon, so that as a general rule it is preferred to operate at −30°C. or lower to avoid the possibility of sulfonation.

The anionic moieties of the cyclic sulfonium salts are easily interchanged to form other salts or the free bases by known methods; for example, by anion exchange with another salt or, preferably, by use of an anion exchange resin.

For those compounds having an alkoxy substituent on each aromatic ring bearing a sulfonium group, an alternative synthesis that may be preferred is available. This method consists of a. making the corresponding sulfonium zwitterion and then b. etherifying the phenolic moiety of the zwitterionic compound.

The preparation of the zwitterions is described by three of us in U.S. Pat. No. 3,660,431. The etherification of step (b) can be effected by use of a strong alkylating agent, such as dialkyl sulfate. These reactions can be illustrated as follows:

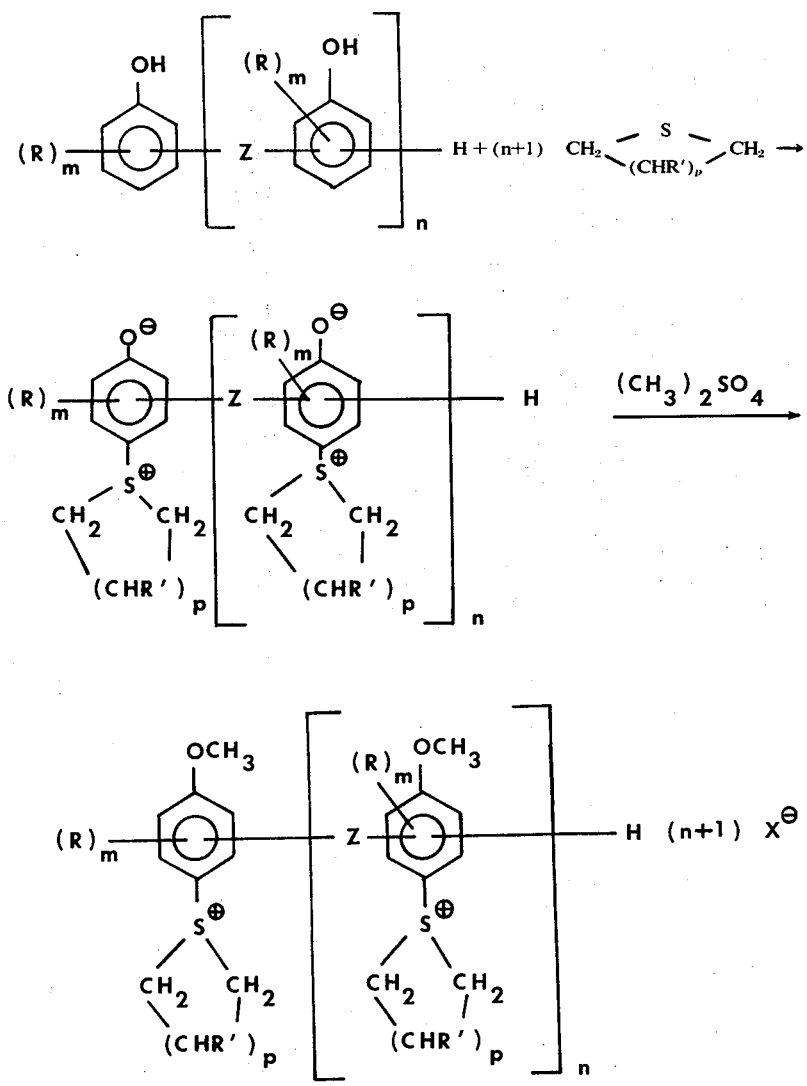

The polynuclear polyphenols used to make the above zwitterions are known or can be made by known methods; e.g., by condensing a phenol with an aldehyde or ketone.

SPECIFIC EMBODIMENTS OF THE INVENTION

The practice of the invention is illustrated by the following examples.

EXAMPLE 1

Preparation of 1,1'-(Oxydiphenylene)bis(Tetrahydrothiophenium) Bisulfate

A solution of 100 g. (0.43 mole) of 4,4'-oxydiphenylene dithiol in 500 ml. of acetone and 34 g. of NaOH (0.84 mole) was added to a boiling solution of 92.7 g. (0.854 mole) of 4-chloro-1-butanol in 250 ml. of acetone. After two hours, the solution was filtered to remove NaCl and acetone was removed under reduced pressure to obtain a slurry. After adding water and filtering, 146 g. (90%) of

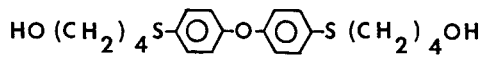

was obtained. M.p. 75°–78°C.

A solution of 140 g. (0.37 mole) of

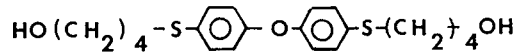

in 800 ml. of pyridine and 80 ml. of benzene was boiled in order to distill off 300 ml. of solution. After cooling to −5°C., 150 g. (0.85 mole) of benzenesulfonyl chloride was added at a rate slow enough to keep the temperature below 0°C. The reaction mixture was kept below 0°C. for 8 hours and then 20 g. of water was slowly added. The temperature was below 0°C. The reaction mixture was poured on a mixture of 3 l. of ice and 250 ml. of concentrated $H_2SO_4$. The resulting mixture was extracted with chloroform and then the chloroform layer was extracted three times with water. The colorless product, 229 g. (94%) was isolated by removal of the chloroform under reduced pressure.

EXAMPLE 2

Preparation of 1,1'-(4,4'-biphenylylene)bis(Tetrahydrothiophenium) Bisulfate

By proceeding substantially as described in Example 1 but replacing the oxydiphenylene dithiol with 4,4'-bis(thiophenol), the title compound was obtained in excellent yield.

EXAMPLE 3

Preparation of 1,1'-(Isopropylidenedi-p-Phenylene)bis(Tetrahydrothiophenium) Bisulfate The subject compound was prepared in excellent yield by substantially the process of Example 1 wherein the oxydiphenylene dithiol was replaced with 4,4'-isopropylidenebis(thiophenol).

EXAMPLE 4

Preparation of the Compound

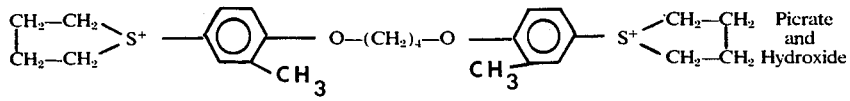

A solution of 5.85 g. (0.0302 m.) of the zwitterion

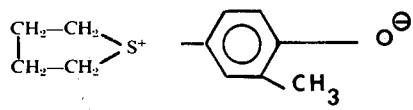

and 5.6 g. (0.015 m.) of the compound

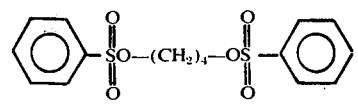

in a mixture of chloroform and methanol was heated with stirring at 30°–40°C. for several hours. The product was precipitated by addition of lithium picrate.

The picrate salt of the product was dissolved in acetone and reprecipitated by addition of water, after which it was converted to the free base by contact with an anion exchange resin (Dowex 1X8, 20–50 mesh, OH form).

EXAMPLE 5

Preparation of the Compound

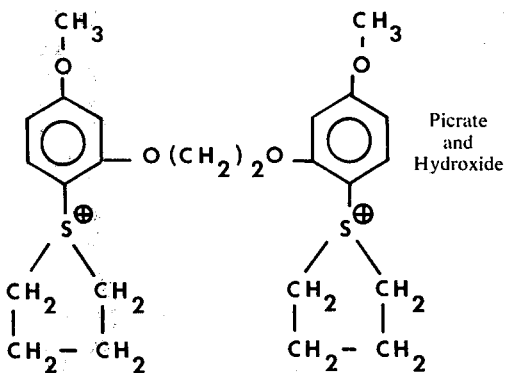

A solution of 20.3 g. (0.097 m.) of the zwitterion

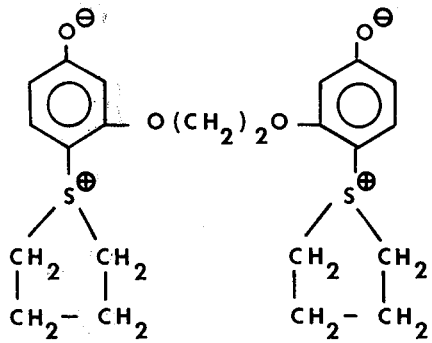

in a mixture of 50 g. of water and 20 g. of methanol was stirred at room temperature as 10 g. (0.08 m.) of dimethyl sulfate was slowly added. It was then heated at 40°–42°C. for 2 hours, cooled and the product precipitated by addition of lithium picrate. The picrate was twice dissolved in acetone and reprecipitated by addition of water and then converted to the free base by contact with Dowex 1X8 resin in the OH form.

EXAMPLE 6
Preparation of the Mixture of the Formula

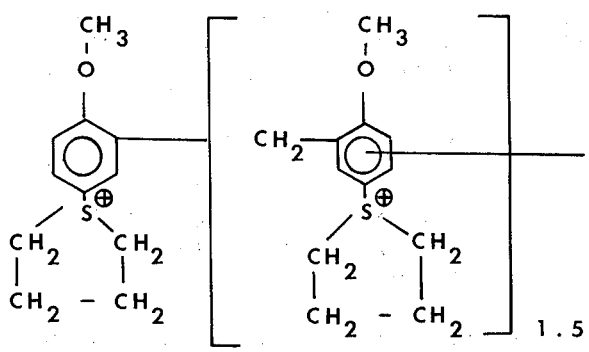

By the method of Example 5, the zwitterion mixture corresponding to the above product was etherified by reaction with dimethyl sulfate and the product was precipitated as the picrate and converted to the free base.

The zwitterion mixture used as starting material was made from the corresponding phenol-formaldehyde novolac resin as described in U.S. Pat. No. 3,660,431.

Other compounds within the scope of the present invention are made by the methods illustrated above by substitution of the appropriate reactants. Thus, the corresponding compounds wherein the tetrahydrothiophenium ring is replaced with a similar 6-membered ring are made as described in Examples 1–3 by replacing the 4-chlorobutanol with 5-chloro- or 5-bromopentanol, or as described in Examples 4–6 by replacing the tetrahydrothiophenium zwitterion with a hexahydrothiopyrylium zwitterion. The latter zwitterions can be made by the same general methods as the former.

By proceeding as described above, the following compounds of the invention are obtained. In the table below, the compounds are identified by the value assigned the various symbols in Formula I above.

TABLE I

| Ex. No. | R | R' | Z | m | n | p | X |
|---|---|---|---|---|---|---|---|
| 7 | $C(CH_3)_3$ | H | S | 1 | 1 | 3 | $HCO_3$ |
| 8 | Cl | $CH_3$ | $(CH_2)_2$ | 2 | 1 | 2 | Cl |
| 9 | $CH_3$ | OH | O | 2 | 3 | 2 | $HSO_4$ |
| 10 | $C_2H_5O$ | H | $O(CH_2)_3O$ | 1 | 1 | 3 | Picrate |
| 11 | $C_6H_5$ | Cl | $CH_2$ | 1 | 2 | 2 | Cl |
| 12 | $C_9H_{19}$ | H | $(CH_2)_4$ | 1 | 1 | 2 | $HSO_4$ |
| 13 | Cl | $C_4H_9$ | O | 1 | 1 | 2 | $HCO_3$ |
| 14 | H | H | O | — | 5 | 3 | Br |
| 15 | $CH(CH_3)_2$ | H | — | 1 | 1 | 3 | $ClO_4$ |

The compounds of the invention are useful intermediates for the preparation of solid resins. They react with a carboxyl-containing material whereby the sulfonium (i.e., the tetrahydrothiophenium or hexahydrothiopyrylium) rings are opened and omega-(arylthio)alkyl ester of the carboxyl group is formed; for example,

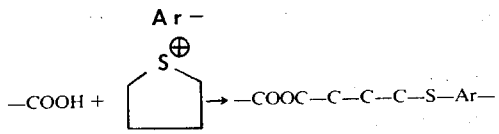

where Ar is an aromatic nucleus.

If the carboxyl-containing material is a dicarboxylic

Picrate
and
Hydroxide acid, the product is a linear or cross-linked resin, depending on whether the sulfonium compound contains only 2 or more than 2 sulfonium rings. If the carboxyl-containing material contains more than 2 carboxyl groups per molecule the resin will be cross-linked by any of the compounds of the invention. This reactivity with carboxyl groups is particularly useful for modifying water-soluble or water-dispersible resins since it enables a mixture of such resin and a polysulfonium compound to be applied as a surface coating which then is cured (i.e., rendered insoluble and water-resistant) by reaction at ambient or elevated temperatures. The following example illustrates this utility.

Various proportions of an aqueous solution of the product of Example 1 were added to separate portions of an aqueous solution of the ammonium salt of a terpolymer of 8% by weight of acrylic acid and 46% each of n-butyl acrylate and methyl methacrylate. Films were then cast on a solid substrate and allowed to dry. Some were then heated at 80°C. for 10 minutes while others were held at room temperature for 12 hours, after which they were tested for water sensitivity by immersion in water for 3 days. It was found that those films containing at least 1.5% by weight of the polysulfonium compound were not appreciably affected by the immersion while those containing none dissolved in a few minutes. Similar results are obtained by use of the other polysulfonium compounds of the invention. That the resin had been cross-linked was further shown by the greatly enhanced resistance of the films to attack by organic solvents.

When stoichiometrically equivalent amounts of the compound of Example 1 and a monomeric polycarboxylic acid were mixed in aqueous solution and applied as a coating, solid, adherent coatings that quickly cured at room temperature were obtained. Those made from succinic acid, a dicarboxylic acid were soluble in organic solvents but not in water, while these made from tricarboxylic acids, such as citric and aconitic acids were cross-linked and solvent-resistant.

It was noted that coatings containing the compounds of the invention cured faster and were much more resistant to water and to discoloration and deterioration by UV light than similar ones containing the zwitterionic sulfonium compounds described in U.S. Pat. No. 3,660,431.

We claim:
1. A compound of the formula

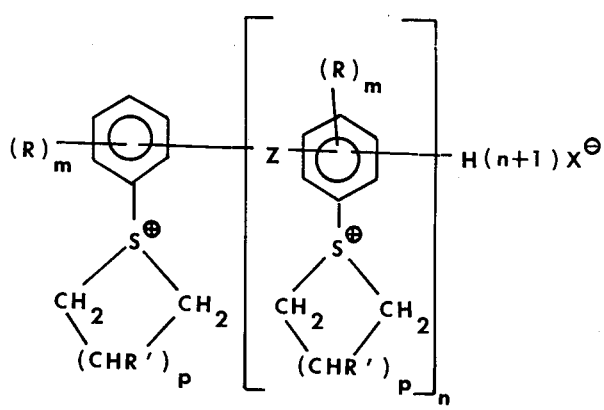

wherein each is H, Cl, lower alkyl, phenyl or lower alkoxy; each R' is H, Cl, Br, OH or lower alkyl; $m$ is 0–2; $n$ is 1–5; $p$ is 2–3; Z is a chemical bond or O, S or alkylene or alkylenedioxy of up to 4 carbon atoms and $X^-$ is an anion.

2. The compound of claim 1 wherein each R is H, lower alkyl or lower alkoxy.

3. The compound of claim 1 wherein Z is O, alkylene or alkylenedioxy.

4. The compound of claim 1 wherein R' is H and $p$ is 2.

5. The compound of claim 1 wherein Z is $CH_2$ and $n$ is greater than 1.

6. The compound of claim 1 wherein X is OH, $HSO_4$, $HCO_3$, Cl or picrate.

7. The process of making the bisulfate salt of a compound of claim 1 comprising reacting the corresponding aryl thioether of the formula

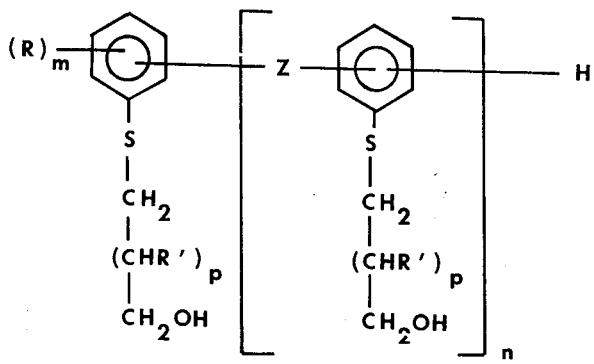

with chlorosulfonic acid.

8. The compound of claim 2 wherein R' is H, $p$ is 2 and z has no more than 4 carbon atoms.

9. The compound of claim 8 wherein X is OH, $HSO_4$, $HCO_3$, Cl or picrate.

10. The compound of claim 9 wherein $n$ is 1.

* * * * *

UNITED STATES PATENT OFFICE
CERTIFICATE OF CORRECTION

PATENT NO. : 3,898,247
DATED : August 5, 1975
INVENTOR(S) : D. L. Schmidt, Hugh B. Smith, Melvin J. Hatch, W. E. Broxterman It is certified that error appears in the above-identified patent and that said Letters Patent are hereby corrected as shown below:

Column 1, line 33, delete "$X^-$" and insert --$X^\ominus$--;

Column 1, lines 55-60, the formula - delete

"$\begin{array}{c}\phi— \\ | \\ SH\end{array}\Big[ Z— \begin{array}{c}\phi \\ | \\ SH\end{array}\Big]_n H$" and insert -- $\phi—\Big[Z— \begin{array}{c}\phi \\ | \\ SH\end{array}\Big]_n H$ with $SH$ on first $\phi$ --

Column 9, line 17, between "each" and "is" insert --R--;

Column 9, line 20, delete "$X^-$" and insert --$X^\ominus$--.

Signed and Sealed this twenty-fifth Day of November 1975

[SEAL]

Attest:

RUTH C. MASON
Attesting Officer

C. MARSHALL DANN
Commissioner of Patents and Trademarks